United States Patent
Messer

(10) Patent No.: US 9,146,797 B2
(45) Date of Patent: Sep. 29, 2015

(54) METHOD FOR ENSURING REMEDIATION OF HUNG MULTIPLEXER BUS CHANNELS

(71) Applicant: AMERICAN MEGATRENDS, INC., Norcross, GA (US)

(72) Inventor: Jason Andrew Messer, Jefferson, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 179 days.

(21) Appl. No.: 13/963,721

(22) Filed: Aug. 9, 2013

(65) Prior Publication Data

US 2015/0046746 A1 Feb. 12, 2015

(51) Int. Cl.
*G06F 11/00* (2006.01)
*G06F 11/07* (2006.01)
*G06F 11/34* (2006.01)
*G06F 13/00* (2006.01)

(52) U.S. Cl.
CPC ........ *G06F 11/0745* (2013.01); *G06F 11/0793* (2013.01); *G06F 11/3485* (2013.01); *G06F 13/00* (2013.01)

(58) Field of Classification Search
CPC . G06F 11/0754; G06F 11/0751; G06F 11/30; G06F 11/3051; G06F 11/3058; G06F 11/3485; G06F 11/0793; G06F 13/00
USPC ............... 714/5.1, 5.11, 23, 43, 44, 47.1, 56
See application file for complete search history.

(56) References Cited

U.S. PATENT DOCUMENTS

| 2007/0240019 A1* | 10/2007 | Brady et al. | 714/43 |
| 2009/0006889 A1* | 1/2009 | Holdaway et al. | 714/9 |
| 2012/0017074 A1* | 1/2012 | Kelly | 713/100 |
| 2013/0166953 A1* | 6/2013 | Tanaka | 714/25 |
| 2013/0205129 A1* | 8/2013 | Peng | 713/2 |

* cited by examiner

*Primary Examiner* — Joseph D Manoskey
(74) *Attorney, Agent, or Firm* — Locke Lord LLP; Tim TingKang Xia, Esq.

(57) ABSTRACT

Technologies are described herein for ensuring remediation of hung multiplexer bus channels between a baseboard management controller (BMC), multiplexer, and I²C device such as a sensor. In particular, a BMC, which is in operative communication with one or more sensors via a multiplexer, comprises an I²C interface and general purpose input/output (GPIO) interface. Upon transmitting an I²C command to the I²C device via the multiplexer and subsequently transmitting a stop sequence to the I²C device via the multiplexer, the BMC then immediately transmits a reset signal to the multiplexer's reset input. When the multiplexer receives the reset signal, it resets all registers and deselects all channels, thereby remediating any hung channels and ensuring the next communication from the BMC is successful.

20 Claims, 3 Drawing Sheets

METHOD FOR ENSURING REMEDIATION OF HUNG MULTIPLEXER BUS CHANNELS

FIELD

The present disclosure generally relates to baseboard management controllers (BMCs) and multiplexers, and more particularly to methods for remediating hung communication channels between a BMC and a multiplexer and ensuring open communication channels between a BMC and a multiplexer.

BACKGROUND

Generally, the term "computer system" refers to either a stand-alone system or a plurality of interconnected systems, such as, for instance, a client-server network. Regardless of the implementation, the various components making up a computer system typically operate within a range of parameters defined by performance protocols or standards. For instance, the temperature within a computer chassis is often monitored in order to detect periods in time when the system may rise above a certain predetermined temperature reading. Other forms of information that may be monitored within a computer system include, without limitation, voltages associated with semiconductor components located on the baseboard of the system, velocity (e.g., rpm) of cooling fans located on the baseboard or within the system chassis, and the velocity of spindle motors within hard disk drives or optical drives.

Various types of sensors are being used to detect operating and performance-related parameters associated with a computer system and its constituent components. Referring to the examples provided above, these sensors include thermostats, voltage meters and tachometers. A computer system typically employs one or more management modules to assist in the collection and analysis of information sensed by the various sensors measuring operating and performance-related parameters within the system. These management modules may be either software or hardware components, but typically encompass both hardware and software components. One such management module is referred to as a "Baseboard Management Controller" (BMC). The BMC is a microcontroller integrated into the baseboard (also known in the industry as the "motherboard") of a computer system and having a specified number of contact pins through which information sensed by various sensors is received for analysis by the BMC. In order to perform this analysis, the BMC is programmed with firmware fir implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range, the occurrence of which is commonly referred to as an "event."

In many cases, to increase the number of sensors and devices a single BMC can monitor, the BMC interfaces with one or more multiplexers, which are devices that forward selected analog or digital input signals to intended recipients. In general, multiplexers are used to increase the amount of data that can be sent over a particular network in a particular amount of time or based on a prescribed bandwidth.

Certain problems can arise, however, when a communications channel between a BMC, a mux, and a device or sensor become hung. When such a channel becomes hung, the BMC loses the ability to send and receive information from any sensor or device connected to that mux. Traditional methods for unhanging a hung channel, such as sending a command from the BMC to reset each of the multiplexer's channels, are ineffective when the communication line between the BMC and mux is hung, leaving the BMC unable to communicate with any sensor or device connected to that particular mux.

Therefore, there is a long-felt but unresolved need for a method that ensuring closure of hung bus channels between a BMC and a multiplexer.

SUMMARY

Technologies are described herein for ensuring remediation of hung multiplexer bus channels between a baseboard management controller (BMC), multiplexer, and $I^2C$ device such as a sensor. In particular, according to one aspect, a BMC, which is in operative communication with one or more sensors via a multiplexer, comprises an $I^2C$ interface and general purpose input/output (GPIO) interface. Upon transmitting an $I^2C$ command to the $I^2C$ device via the multiplexer and subsequently transmitting a stop sequence to the $I^2C$ device via the multiplexer, the BMC then immediately transmits a reset signal to the multiplexer's reset input. When the multiplexer receives the reset signal, it resets all registers and deselects all channels, thereby remediating any hung channels and ensuring the next communication from the BMC is successful.

One aspect of the present disclosure relates to a system comprising a BMC comprising an $I^2C$ interface, a GPIO interface, a processor and a non-volatile memory storing a computer-executable program that, when executed by the processor, is configured to transmit an $I^2C$ command to an $I^2C$ device via a multiplexer, wherein the $I^2C$ command is transmitted via the $I^2C$ interface; transmit a stop sequence to the $I^2C$ device via the multiplexer, wherein the stop sequence is transmitted via the $I^2C$ interface; immediately after the transmission of the stop sequence, transmit a reset signal to the multiplexer, which comprises a reset input, wherein the reset signal is transmitted via the GPIO interface.

A further aspect of the present disclosure relates to a method comprising the steps of transmitting from the BMC an $I^2C$ command to an $I^2C$ device and transmitting a stop sequence to the $I^2C$ device, where both the command and stop sequence are transmitted via the $I^2C$ interface and through the multiplexer; and immediately subsequent to the step of transmitting the stop sequence, transmitting a reset signal to the reset input of the multiplexer, wherein the reset signal is transmitted via the GPIO interface.

One further aspect of the present disclosure relates to a non-transitory computer readable medium storing executable instructions configured to cause a computer system to execute a method comprising: transmitting from a BMC an $I^2C$ command to an $I^2C$ device via a multiplexer, wherein the $I^2C$ command is transmitted via an $I^2C$ interface of the BMC; transmitting from the BMC a stop sequence to the $I^2C$ device via the multiplexer, wherein the stop sequence is transmitted via the $I^2C$ interface of the BMC; immediately subsequent to the step of transmitting the stop sequence, transmitting from the BMC a reset signal to a reset input of the multiplexer, wherein the reset signal is transmitted via a general purpose input/output (GPIO) interface of the BMC.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

These and various other features as well as advantages, which characterize the technologies presented herein, will be apparent from a reading of the following detailed description and a review of the associated drawings.

BRIEF DESCRIPTION OF THE DRAWINGS

The accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
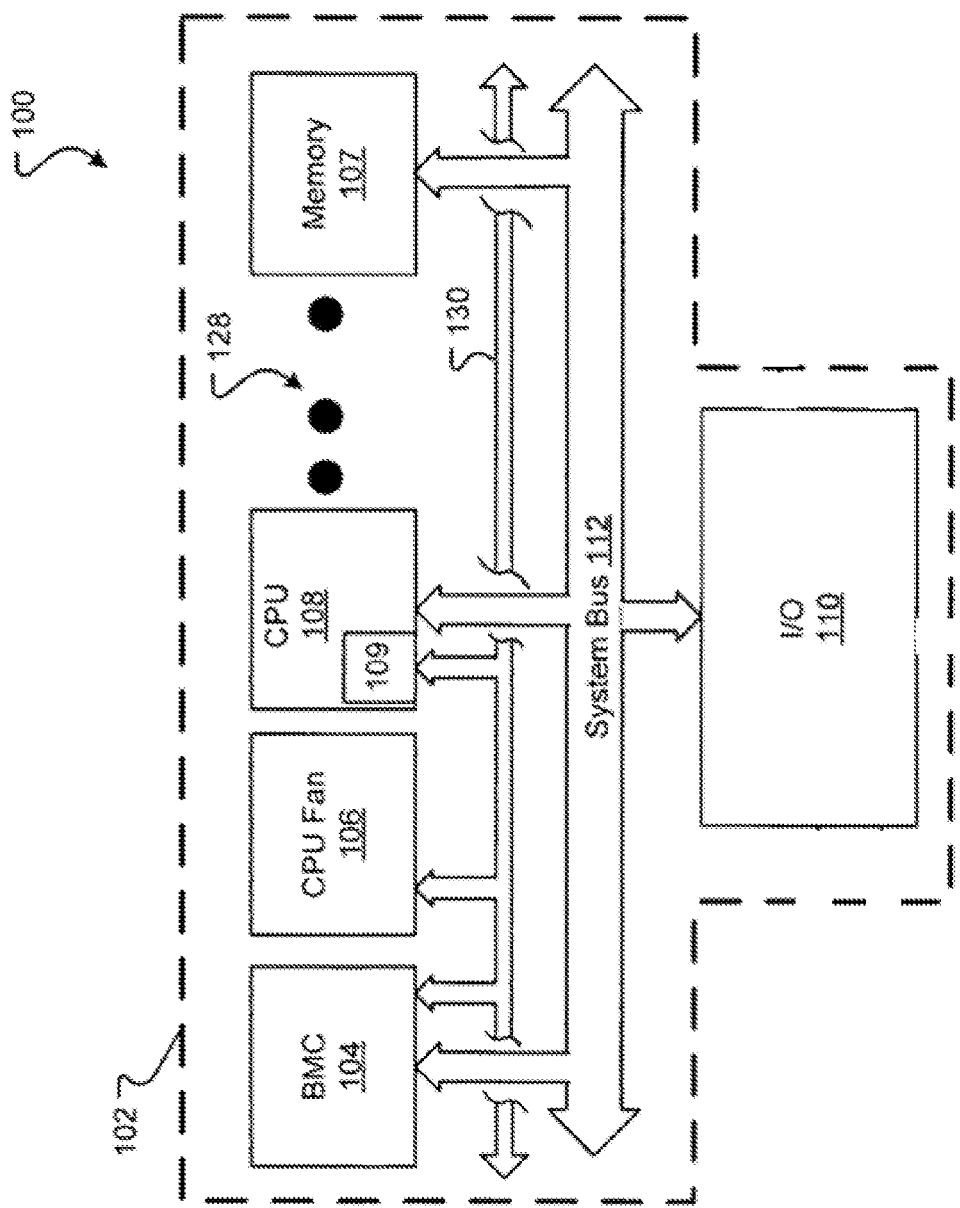
FIG. 1 depicts a computer system in which a management module monitors and controls operation of various components of the computer system in accordance with an embodiment of the present disclosure.

The present disclosure is more particularly described in the following examples that are intended as illustrative only since numerous modifications and variations therein will be apparent to those skilled in the art. Various embodiments of the present disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the present disclosure or of any exemplified term. Likewise, the present disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawing, FIG. 1, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

Referring to FIG. 1, a conceptual illustration of an environment associated with the present disclosure is shown in accordance with an embodiment of disclosure. FIG. 1 shows a computer system 100, and more specifically a stand-alone, general purpose computer system. It should be appreciated that the computer system 100 may alternatively be a "special purpose" computer system or a system that incorporates more than one interconnected system, such as a client-server network. Indeed, the computer system 100 of FIG. 1 only represents an exemplary embodiment of the present disclosure, and therefore, should not be considered to limit the disclosure in any manner.

The central intelligence of the computer system 100 is a baseboard 102, or "motherboard," which is a printed circuit board to which a multitude of components or devices may be connected by way of a system bus 112 or other electrical communication path (not shown). In one embodiment, these components include, without limitation, a baseboard management controller (BMC) 104, a central processing unit (CPU) 108, memory 107, and an Input/Output module 110. It is also contemplated that the system bus 112 may include other components that are not explicitly shown in FIG. 1. As such, repetition dots 128 illustrate the possible connection of these other components to the system bus 112. The layout of components on the baseboard 102, including the manner in which the components are interconnected, is herein referred to as the "configuration" of the baseboard 102.

According to one embodiment, the system bus 112 provides a two-way communication path for all components connected to the system bus 112. The component that initiates a communication on a bus is referred to as a "master" component and the component to which the initial communication is sent on the bus is referred to as a "slave" component. A master component therefore issues an initial command to or initially requests information from a slave component. Each slave component is addressed, and thus communicatively accessible to master components, by a particular slave address. Both master components and slave components are operable to transmit and receive communications over the system bus 112. Buses and the associated functionality of master-slave communications are well-known to those skilled in the a and therefore not discussed in further detail.

In one embodiment, the CPU 108 is a standard central processor that performs arithmetic and logical operations necessary for the operation of the computer system 100. CPUs are well-known in the art, and therefore not described in further detail. Like many electrical components, the CPU 108 dissipates heat while operating. As such, a CPU fan 106 is used to cool the CPU 108 upon reaching a prescribed temperature. According to one embodiment, a BMC 104 determines whether the CPU 108 exceeds a prescribed temperature as the BMC 104 is communicatively coupled to a CPU temperature sensor 109 and the CPU fan 106 by way of a management bus 130. Likewise, the BMC 104 is able to provide monitoring functionality over the temperature sensor 109 and control functionality over the CPU fan 106 via the management bus.

In general, the BMC 104 is a microcontroller that monitors operation of the computer system 100. In one embodiment, the BMC 104 monitors health-related aspects associated with the computer system 100, such as the temperature of one or more components of the computer system 100, speed of rotational components (e.g., spindle motor, CPU Fan, etc.) within the system, the voltage across or applied to one or more components within the system 100, and the available or used capacity of memory devices within the system 100. To accomplish these monitoring functions, the BMC 104 is communicatively connected to one or more components by way of a management bus 130. In one embodiment, these components include sensor devices for measuring various operating and performance-related parameters within the computer system 100. The sensor devices may be either hardware or software based components configured or programmed to measure or detect one or more of the various operating and performance-related parameters. Like the system bus 112, the component that initiates communication on a bus is referred to a master and the component to which the communication is sent is referred to a slave. As such, the BMC 104 functions as the master on the management bus 130 in most circumstances, but may also function as either a master or a slave in other circumstances. Each of the various components communicatively connected to the BMC 104 by way of the management bus 130 is addressed using a slave address.

According to one embodiment and as will be discussed further in relation to FIG. 2, to increase the number of components a single BMC 104 can monitor, the BMC 104 interfaces with one or more multiplexers, which generally is communicatively coupled to the BMC 104 by way of a management bus 130. In general, multiplexers are devices that forward selected analog or digital input signals to intended recipients. Typically, multiplexers are used to increase the amount of data that can be sent over a particular network in a particular amount of time or based on a prescribed bandwidth.

Typically, the BMC 104 uses the management bus to request and/or receive various operating and performance-related parameters from one or more components, which are also communicatively connected to the management bus 130. As shown in the FIG. 1 embodiment, the management bus 130 communicatively connects the BMC 104 to the CPU temperature sensor 109 and the CPU fan 106, thereby providing a means for the BMC 104 to monitor and/or control operation of these components. As with the system bus 112, the management bus 130 may include components other than those explicitly shown in FIG. 1. Exemplary components not shown in FIG. 1 may include, without limitation, tachometers, heat sensors, voltage meters, amp meters, and digital and analog sensors. Additionally, as discussed, one or more multiplexers may be incorporated to allow a BMC 104 to monitor and/or control operations of such components. In an embodiment, the management bus 130 is an $I^2C$ bus, which is manufactured by PHILLIPS SEMICONDUCTORS and described in detail in the $I^2C$ Bus Specification, version 2.1 (January 2000).

In certain embodiments, firmware of the BMC 104 adheres to the Intelligent Platform Management Interface (IPMI) industry standard for system monitoring and event recovery. The IPMI protocol is a standardized computer system interface protocol for out-of-band management of computer systems and monitoring of the operation, which is session-based, requiring an IPMI session be established between the application module and the target IPMI device before the application module can communicate with the target IPMI device. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection. The BMC 104 can receive IPMI instructions or requests from a locally connected management computer through a system interface, or as external requests through a network interface. Additional details regarding IPMI can be found in the IPMI Specification (Version 2.0), which is publicly available from INTEL CORPORATION, and which is incorporated herein by reference.

The BMC 104 monitors operating and performance-related parameters received from various components of the computer system 100 in order to determine whether an "event" is occurring within the system 100. In an embodiment, these components may be either directly or indirectly connected to the baseboard 102. For example, with respect to the configuration shown in FIG. 1, the BMC 104 monitors operation of the CPU 108 (by way of the CPU temperature sensor 109) and the CPU fan 106 to determine whether certain operating or performance related parameters exceed or fall below prescribed threshold ranges of operation.

According to one embodiment, the BMC 104 may also control one or more components of the computer system 100 in response to the occurrence of an event. For example, if the BMC 104 detects a temperature that is out of a prescribed range, the BMC 104 may initiate operation of the CPU fan 106. In addition, it is also contemplated that the BMC 104 may be connected to and receive sensed information from components connected directly to a contact pin 204 (FIG. 2) of the BMC 104 or indirectly by way of a bus (e.g., system bus 112) other than the management bus 130.

In one embodiment, the Input/Output module 110 is used as a communication medium between any number and type of peripheral devices and the system bus 112. Communications destined for the CPU 108, the BMC 104 or any other component coupled to the system bus 112 and issued by a peripheral device must therefore pass through the Input/Output module 110 to the system bus 112 and then to the necessary component.

Figure 2:
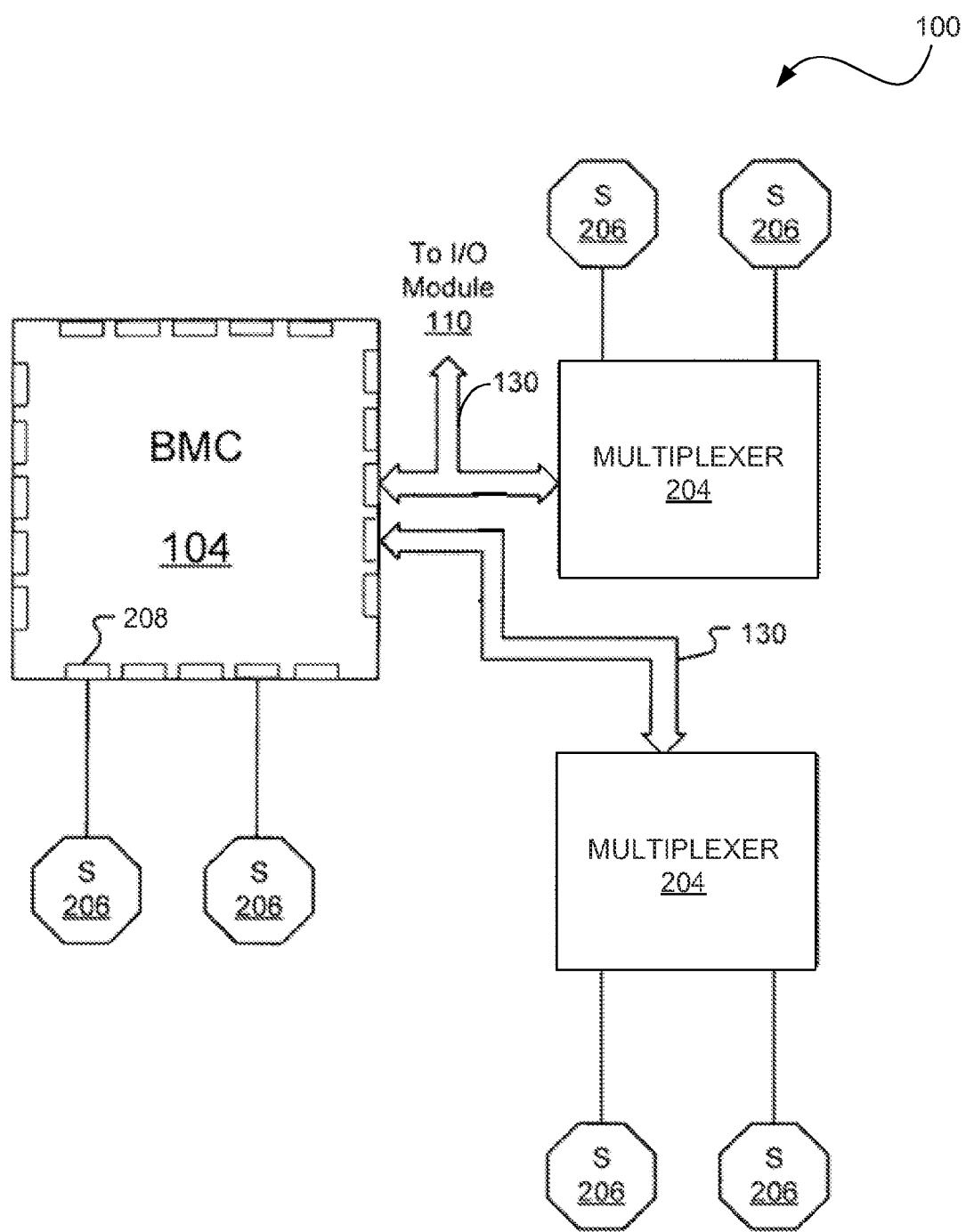
FIG. 2 illustrates a logical configuration of sensors communicatively connected to the management module of FIG. 1 in accordance with an embodiment of the present disclosure.

Referring now to FIG. 2, an exemplary configuration of sensor devices 206 connected to the BMC 104 or to a multiplexer 204 is shown in accordance with an embodiment of the present disclosure. The sensor devices include various types of sensors 206. As discussed previously, the sensors 206 measure or sense operating and performance-related parameters associated with the computer system 100. The multiplexers 204 receive the information sensed by the sensors 206 and provide this information to the BMC 104 for analysis. Further, the multiplexers 204 provide sensed information to the BMC 104 to allow the BMC 104 to determine whether an "event" is occurring within the computer system 100. Alternatively, the BMC 104 can receive information directly from the sensors 206.

As shown in FIG. 2, sensors 206 are connected to, and therefore communicate with, the BMC 104 or the multiplexers 204 by way of contact pins 208 located on the BMC 104 or the multiplexers. According to the FIG. 2 embodiment, the multiplexers 204 are connected to the BMC contact pins 204 by way of the management bus 130. As discussed previously, the sensors 206 sense or measure information and subsequently transmit this information to either the BMC 104 or a multiplexer 204, if to the multiplexer 204, then the information is passed by the multiplexer 204 to the BMC 104. The BMC 104 then analyzes the information sensed by the sensor components 206 and issues an alert that an event is occurring and/or controls operation of one or more components within the computer system based on the determination that an event is taking place.

While the sensors 206 are described in general terms when describing FIG. 2, it should be appreciated that these sensors 206 may be digital or analog sensors that sense any type of information. For example, the sensors 206 may sense, without limitation, temperature of a component (e.g., CPU 108) of the computer system 100, temperature within the chassis of the computer system 100, a voltage and/or current reading associated with a component of the computer system 100, or velocity and/or acceleration of a component (e.g., spindle motor, etc.) of the computer system 100. It is also contemplated that the sensors 206 may be implemented as a software/firmware routine that senses information related to events associated with operation of either firmware or software modules implemented on the computer system 100.

Figure 3:
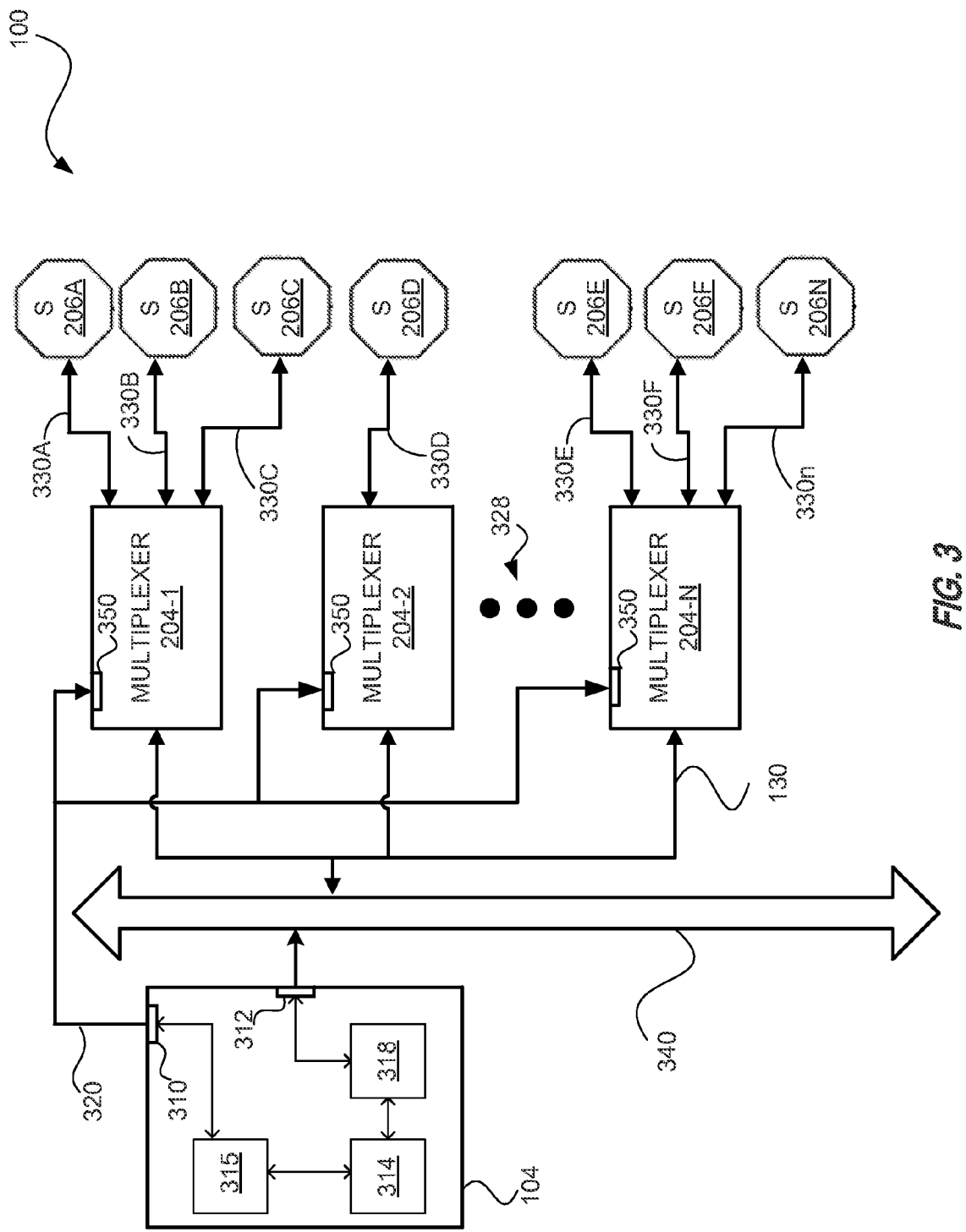
FIG. 3 illustrates a further logical configuration of sensors communicatively connected to the management controller of FIG. 1 via a plurality of multiplexers in accordance with an embodiment of the present disclosure.

Turning now to FIG. 3, further detail is shown of BMC 104, which comprises BMC firmware module 314. The BMC firmware module 314 provides the functionality to the BMC 104 for configuring, managing, and monitoring of the computer system 100. The BMC firmware 314 may provide a comprehensive operating environment for the BMC 104, such as that provided by the AMI MEGARAC® PM baseboard management controller stack from American Megatrends, Inc., of Norcross, Ga. The BMC 104 may interface with the primary hardware and software systems of the computer system 100 as part of an IPMI structure. In particular, the BMC firmware module 314 may be used to implement procedures relating to system monitoring and recovery. Further, the BMC firmware 314 can be configured to send signals or communications via various pins or interfaces on the BMC 104, such as through GPIO interface 310 or I²C interface 312.

As shown in the FIG. 3 embodiment, the BMC firmware 314 is also configured to communicate with I²C driver 318. In one embodiment, the I²C driver 318 comprises a library of files and functions for implementing and managing communications with the I²C interface 312. As further shown in the FIG. 3 embodiment, the BMC firmware 314 is configured to communicate with GPIO driver 315. In one embodiment, the GPIO driver 315 comprises a library of files and functions for implementing and managing communications with the GPIO interface 310.

Additionally, FIG. 3 shows further detail of multiplexers 204-1 and 204-2 connected to BMC 104 via management bus 130 by way of I²C bus 340. As it is contemplated that the BMC 104 can be connected to any number of multiplexers, BMC 104 is further connected to multiplexer 204-N via the management bus 130 by way of I²C bus 340, and repetition dots 328 illustrate the possible connection of additional multiplexers.

As further shown in the FIG. 3 embodiment, multiplexer 204-1 is connected to sensors 206A, 206B, and 206C via two-wire buses 330A, 330B, and 330C, respectively. Therefore, BMC 104 is connected to sensors 206A, 206B, and 206C through a communication channel provided by I²C bus 340, management bus 130, and multiplexer 204-1. Likewise, multiplexer 204-2 is connected to sensor 206D via two-wire bus 330D. Therefore, as shown in the FIG. 3 embodiment, BMC 104 is connected to sensor 206D through a communication channel provided by I²C bus 340, management bus 130, and multiplexer 204-2. Finally, multiplexer 204-N is connected to sensors 206E and 206F via two-wire buses 330E and 330F. As it is also contemplated that the BMC 104 can be connected to any number of sensors, multiplexer 204-N is connected to sensor 206N via two-wire bus 330N. Therefore, BMC 104 is connected to sensors 206E, 206F, and 206N through the communication channel provided by I²C bus 340, management bus 130, and multiplexer 204-N.

An I²C bus (e.g., 340), which is a serial data bus used for low-speed data communication and control between integrated circuits, is well known. Bi-directional I²C buses (e.g., 340) are bidirectional and utilize a single serial data line (SDA) and single serial clock line (SCL). An I²C bus 340 generally connects master devices (e.g., BMC 104) to slave devices (e.g., multiplexer 204-1), which are referred to as "master nodes" and "slave nodes," respectively. Master nodes generate clock signals and initiate communications with slave nodes, while slave nodes receive the clock signal and respond with data or other information when addressed by the master node. Master and slave roles are reversible and can be changed between messages after a stop message is sent/received. As shown in the FIG. 3 embodiment, the I²C bus 340 interfaces with the BMC 104 via I²C interface 312.

As discussed previously, a multiplexer (e.g., 204-1) allows the BMC 104 to send and receive information to and from a sensor (e.g., 206A). The multiplexer (e.g., 204-1) acts similarly to a switch, but it is distinguishable from a switch because it can enable multiple channels at a time. To communicate with a particular sensor, the BMC 104 must enable the channel that connects the sensor to the BMC 104, which in one embodiment is accomplished by sending a command over the management bus to the multiplexer connected to the preferred sensor.

According to the FIG. 3 embodiment, the multiplexers (e.g., 204-1) and sensors (e.g., 206A) are I²C devices, which are slave devices (i.e., slave nodes) with slave addresses wherein the BMC 104 serves as the master device (i.e., master node). Therefore, in the present example and for discussion purposes, multiplexer 204-1 can be said to have address "EE," while multiplexer 204-2 can be said to have address "FF" and multiplexer 204-N can be said to have address "NN." Further, in one embodiment, the addresses for channels coming from a multiplexer (e.g., 204-1) are generally bit-based, so, for example, the channel for sensor 206A could be addressed as "01," while the channel for sensor 206B could be addressed as "10," etc.

When a master device (e.g., BMC 104) wishes to communicate with a slave device (e.g., sensor 206A), which is downstream from a multiplexer (e.g., 204-1), the BMC 104 begins by issuing a start condition on the I²C bus 340. The start condition (i.e., start sequence) is a bit that marks the beginning of a transaction and alerts all slave devices on the I²C bus 340 that a transaction is starting and that the BMC 104 may be attempting to initiate communications. In one embodiment, the start sequence is a sequence where the data line (SDA) changes will the clock line (SCL) is still high. Generally, the start sequence involves driving the data line from high to low while the clock line remains high.

Next, BMC 104 transmits a byte representing the address of the slave device with which the BMC wishes to communicate. In the present example, BMC 104 transmits a byte representing address EE01, which are associated with multiplexer 204-1 and sensor 206A, respectively. According to one embodiment, for every eight bits transferred (i.e., after every transferred byte), the device receiving the data returns an acknowledgment bit indicating it has received the data and is ready to accept a subsequent byte. Therefore, in the present example, after receiving the byte from the BMC 104, sensor 206A would transmit an acknowledgment bit to BMC 104 indicating it is ready to receive further communication.

Alternatively, to open a communication channel with sensor 206D, after sending a start condition, BMC 104 sends a byte representing address EE10. To open a communication channel with sensor 206F, following the start condition, BMC 104 sends a byte representing address NN 01. Once the sensor acknowledges receipt of the byte from the BMC 104, a communication channel is enabled (e.g., the communication channel between BMC 104 and sensor 106A), and the BMC 104 can read information collected by the sensor or write information to the sensor.

In one embodiment, the byte transmitted by the BMC 104 that represents the address of the multiplexer and sensor with which the BMC 104 wishes to communicate also includes a bit indicating whether the BMC 104 wishes to read from or write to the sensor 206A. According to one embodiment, when the BMC 104 wants to read information from the sensor 206A, the read/write bit of the byte representing the address of sensor 206A is set high. Upon receipt of an acknowledgment bit from sensor 206A, BMC 104 is able to read information collected by the sensor 206A. The BMC 104 can read any number of data bytes from the sensor 206A, and the BMC 104 terminates the transaction by sending a stop sequence (i.e., stop condition). As with the start condition, the stop condition is a single bit. In the case of the stop sequence, the bit is used to drive the data line from low to high while the clock line is high.

On occasion, a communication channel between the BMC 104 and a sensor (e.g., 206A) will become hung such that the BMC 104 and sensor 206A are no longer sending and receiving information, but the communication channel remains open such that the BMC 104 cannot communicate with other sensors downstream from the same multiplexer (e.g., 204-1). For example, if the communication channel between BMC 104 and sensor 206A hangs, BMC 104 loses the ability to communicate with multiplexer 204-1 or sensors 104B and 104C.

Communication channels can become hung for various reasons. For example, a particular sensor (e.g., 206A) may cease to function properly, and the communication channel between that sensor (e.g., 206A) and BMC 104 will hang. Alternatively, the sensor 206A may be accessed incorrectly, in which case it may be waiting to receive a stop sequence from the BMC 104 before it closes the communication channel, thus causing the channel to hang. In certain cases, a porting engineer's code may not correctly access the sensor 206A, thus resulting in a hung channel. The channel can also become hung because of a hardware issue or because of a noise glitch that causes an unintended spike in the data line. Regardless of the case, when a communication channel hangs (i.e., the communication channel between BMC 104 and sensor 206A), BMC 104 can no longer communicate with multiplexer 204-1 and, as a result, can no longer communicate with sensors 206A-C. The BMC 104 can, however, still communicate with multiplexers 204-2 and 204-N.

In certain embodiments, BMC 104 can write a reset signal to multiplexer 204-1 that will reset all channels connected to the multiplexer 204-1 and would, in theory, unhang a hung channel. To send such a signal, however, the bus connecting BMC 104 and multiplexer 204-1 must be usable. Therefore, in the case of a hung channel as described above, such a reset signal is ineffective and therefore alternative approach is necessary.

As shown in the FIG. 3 embodiment, multiplexer 204-1 comprises a reset input 350 that is tied to the GPIO interface 310 of a GPIO pin on the BMC 104 via data line 320. Multiplexers 204-2 and 204-N likewise comprise reset inputs 350 tied to GPIO interface 310 of GPIO pins on the BMC 104 via data line 320. The reset input 350 is an active-low signal that can be utilized to recover from hung channel conditions, therefore allowing communications to and from all devices and sensors attached to the multiplexer 204-1. When the reset signal input 350 is asserted low for a predetermined period of time, the multiplexer 204-1 resets its registers, and all channels are deselected.

According to one embodiment, BMC 104 can reset the multiplexer 204-1 by utilizing GPIO interface 310. In one embodiment, BMC firmware 314 comprises code to call a function from the GPIO driver 315 that will assert low the reset signal input 350 by sending a signal over the reset line 320 via GPIO pin 310. According to the embodiment, asserting the reset signal input 350 low for a predetermined period of time resets all registers of multiplexer 204-1 and deselects all channels, thus clearing any hung channels.

As noted, in the FIG. 3 embodiment, the reset input 320 must be asserted low to reset the multiplexer (e.g., 204-1). Therefore, in one embodiment, the BMC firmware 314 comprises code to call a reset function from the GPIO driver 315 to transmit a reset signal to drive the reset input 350 low, thus resetting the multiplexer 204-1 and ensuring there are no hung channels. In one embodiment, the BMC firmware 314 can be programmed to call the reset function after transmitting stop sequence to the sensor (e.g., 206A). As discussed, the stop sequence completes the transaction between the BMC 104 and the sensor (e.g., 206A). Therefore, the reset would occur subsequent to the BMC 104 access of the multiplexer 206A. In one embodiment, the BMC firmware 314 calls the reset function immediately after the stop sequence is transmitted to the sensor, in which case no other commands are issued by the BMC 104 until the reset function is called.

In one embodiment, the BMC firmware 314 can be programmed to call the reset function subsequent to transmitting the start sequence to the I²C bus 340 via I²C interface 312. As discussed, the start sequence alerts all slave devices on the I²C bus 340 that the BMC 104 is initiating a transaction. Subsequently, the BMC firmware 314 can call the reset function, thus ensuring there are no hung channels. Alternatively, the BMC firmware 314 can be programmed to call the reset function prior to transmitting a start sequence to the I²C bus. Again, resetting the multiplexer (e.g., 204-1) prior to sending a start sequence ensures that no channels between the BMC 104 and multiplexer 204-1 are hung.

As will be understood and appreciated, resetting the multiplexer 204-1 after each access ensures that no offending communication on a downstream multiplexer channel (e.g., 330A) causes a permanent failure of the multiplexer 204-1. Further, sending a reset signal over the reset line 320 after each access of the multiplexer 204-1 as opposed to attempting to send a reset signal over the management bus 130A prevents unnecessary traffic over the management bus 130A and is a faster option as well.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching.

The embodiments were chosen and described in order to explain the principles of the present disclosure and their practical application so as to enable others skilled in the art to utilize the present disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for resetting a multiplexer in a computer system, wherein the computer system comprises a baseboard management controller (BMC), and the BMC comprises an I²C interface and a general purpose input/output (GPIO) interface that are in communication with the multiplexer, the method comprises steps of:

transmitting from the BMC an I²C command to an I²C device via the multiplexer, wherein the I²C command is transmitted via the I²C interface;

transmitting from the BMC a stop sequence to the I²C device via the multiplexer, wherein the stop sequence is transmitted via the I²C interface; and in response to transmitting the stop sequence, transmitting from the BMC a reset signal to the reset input of the multiplexer, wherein the reset signal is transmitted via the GPIO interface.

2. The method of claim 1, wherein the BMC is configured to monitor health-related aspects associated with the computer system.

3. The method of claim 1, wherein the I²C device is a sensor.

4. The method of claim 3, wherein the sensor senses one or more of temperature, rotational speed, applied voltage.

5. The method of claim 1, wherein the stop sequence comprises a single bit.

6. The method of claim 1, wherein the reset signal causes all multiplexer channels to be deselected and resets all multiplexer registers.

7. The method of claim 1, wherein the BMC further comprises BMC firmware, an I²C driver, and a GPIO driver.

8. The method of claim 7, wherein the BMC firmware and I²C driver are configured for generating the I²C command for transmitting from the BMC to the I²C device via the multiplexer.

9. The method of claim 7, wherein the BMC firmware and GPIO driver are configured for generating the reset signal for transmitting from the BMC to the reset input of the multiplexer.

10. A system, comprising:
a baseboard management controller (BMC) comprising:
an I²C interface;
a general purpose input/output (GPIO) interface;
a processor; and
a non-volatile memory storing a computer-executable program that, when executed by the processor, is configured to
transmit an I²C command to an I²C device via a multiplexer, wherein the I²C command is transmitted via the I²C interface;
transmit a stop sequence to the I²C device via the multiplexer, wherein the stop sequence is transmitted via the I²C interface; and
in response to the transmission of the stop sequence, transmit a reset signal to the multiplexer, wherein the reset signal is transmitted via the GPIO interface,
wherein the multiplexer comprising a reset input configured to receive the reset signal.

11. The system of claim 10, wherein the BMC is configured to monitor health-related aspects associated with a computer system comprising the BMC.

12. The system of claim 10, wherein the I²C device is a sensor.

13. The system of claim 12, wherein the sensor senses one or more of temperature, rotational speed, applied voltage.

14. The system of claim 10, wherein the stop sequence comprises a single bit.

15. The system of claim 10, wherein the reset signal causes all multiplexer channels to be deselected and resets all multiplexer registers.

16. The system of claim 10, wherein the computer-executable program is BMC firmware.

17. The system of claim 16, wherein the BMC further comprises an I²C driver and a GPIO driver, wherein the I²C driver and GPIO driver are computer-executable programs.

18. The system of claim 17, wherein the BMC firmware and I²C driver, when executed by the processor, are configured to generate the I²C command.

19. The system of claim 17, wherein the BMC firmware and GPIO driver, when executed by the processor, are configured to generate the reset signal.

20. A non-transitory computer readable medium storing executable instructions configured to cause a computer system to execute a method comprising:
   transmitting from a baseboard management controller (BMC) an I²C command to an I²C device via a multiplexer, wherein the I²C command is transmitted via an I²C interface of the BMC;
   transmitting from the BMC a stop sequence to the I²C device via the multiplexer, wherein the stop sequence is transmitted via the I²C interface of the BMC; and
   in response to transmitting the stop sequence, transmitting from the BMC a reset signal to a reset input of the multiplexer, wherein the reset signal is transmitted via a general purpose input/output (GPIO) interface of the BMC.

* * * * *